United States Patent [19]

Cholet

[11] 4,220,109
[45] Sep. 2, 1980

[54] DEVICE FOR CONTROLLING THE DEPTH OF AN ELEMENT TOWED IN WATER

[75] Inventor: Jacques Cholet, L'Etang la Ville, France

[73] Assignee: Institut Francais Du Petrole, Rueil Malmaison, France

[21] Appl. No.: 944,675

[22] Filed: Sep. 22, 1978

[30] Foreign Application Priority Data

Sep. 23, 1977 [FR] France .................. 77 29244

[51] Int. Cl.² .................. B63B 39/06; B63B 43/04
[52] U.S. Cl. .................. 114/245; 114/332; 244/203
[58] Field of Search .................. 9/8 R; 244/203, 90 B, 244/76 C; 114/126, 330, 332, 244, 245, 313

[56] References Cited
U.S. PATENT DOCUMENTS 3,372,666  3/1968  Baker .................. 114/245
3,611,975  10/1971  Ashbrook .................. 114/245

Primary Examiner—Trygve M. Blix
Assistant Examiner—D. W. Keen
Attorney, Agent, or Firm—Millen & White

[57] ABSTRACT

Device for controlling the submersion depth of an element moving through a body of water comprising a pivotable wing having an upper and a lower wall articulated to each other at one end and interconnected at the other end through a deformable incurved wall, the wing housing spacing elements, between the upper and the lower wall, which are compressed or expanded in response to the hydrostatic pressure variation, resulting from a depth variation of the element, thereby producing a space variation between the two walls, and a system for converting said space variation to a rotation of the wing with respect to the submerged element, in a direction at which the movement of the element tends to an opposite variation of the hydrostatic pressure.

10 Claims, 7 Drawing Figures

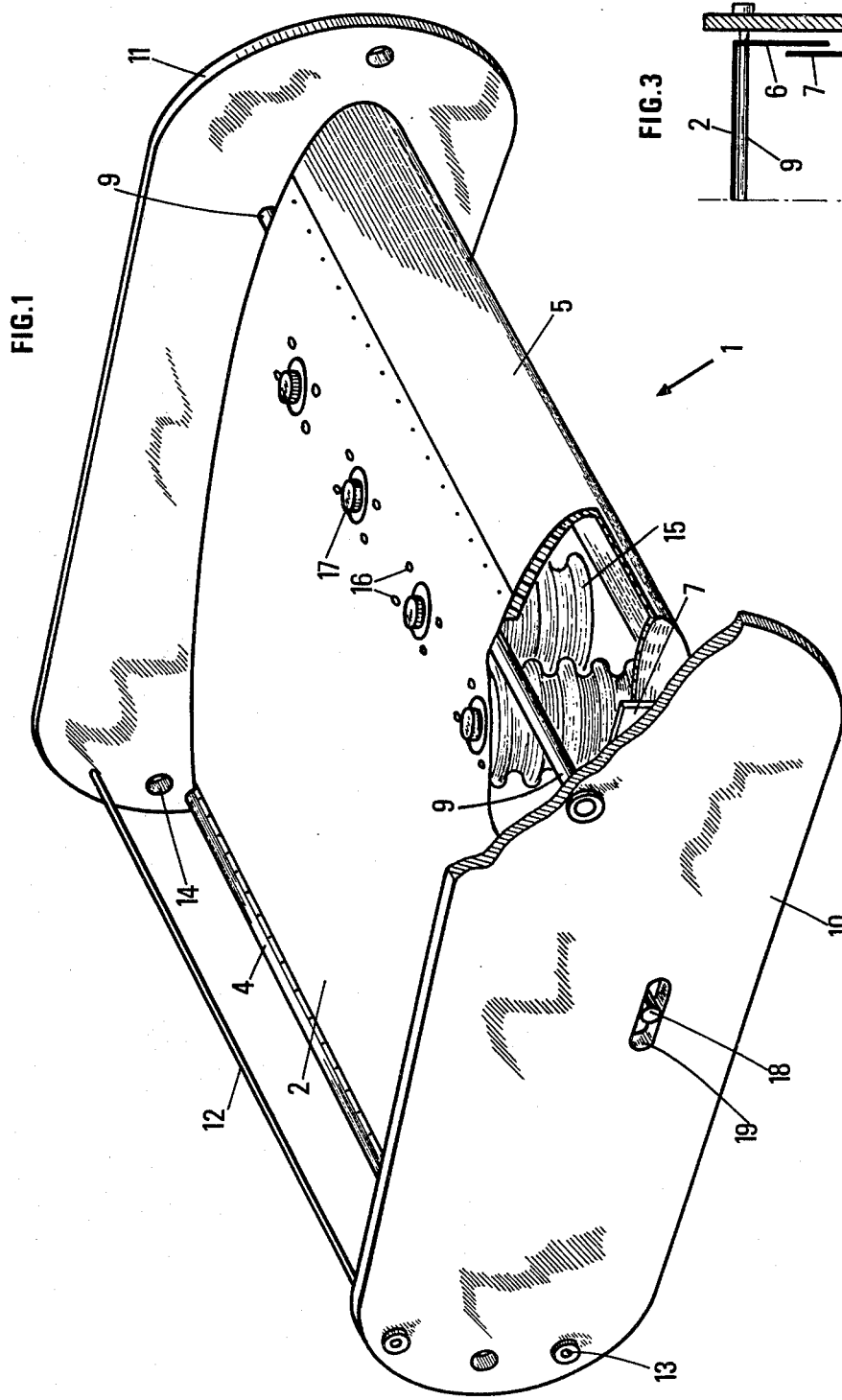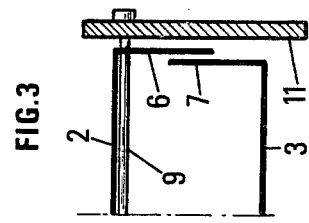

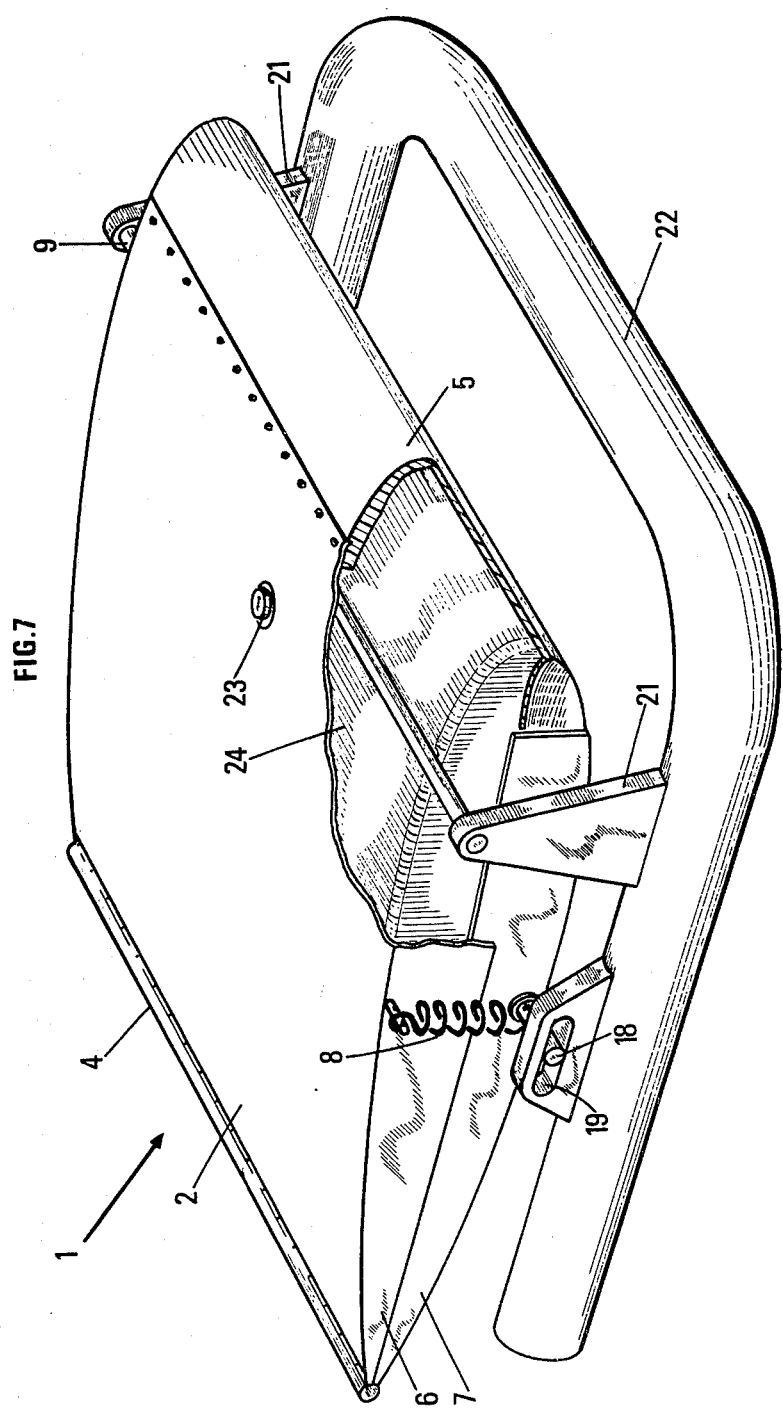

DEVICE FOR CONTROLLING THE DEPTH OF AN ELEMENT TOWED IN WATER

This invention relates to a device for controlling the depth of a submerged element towed in water. This device may be used in all cases where it is desired to regulate the depth of an element operating in the sea. It is for example very well adapted, in the field of submarine seismic prospection, to the stabilization at a determined depth, called "reference depth," of seismic sources or receiving streamers. It may also be advantageously used for regulating the submersion, at a determined depth, of an echo-sounder, a sonar or even a water sampling device.

It comprises a wing pivotable with respect to the submerged element, said wing comprising at least two walls or plates, movable with respect to each other, and a system for converting the space variations between the two plates, resulting from the effect of the hydrostatic pressure variation, into a rotation of the wing about an axis fixedly secured to the submerged element.

The advantages and other characteristics of the device according to the invention will be made apparent from the following description of two non-limitative embodiments thereof, with reference to the accompanying drawings, wherein:

FIG. 1 is a general view of a first embodiment of the wing;

FIG. 3 is a partial cross-sectional view illustrating the lateral fitting of the two side-walls of the wing;

FIG. 7 is a general view of a second embodiment of the wing.

Figure 4:
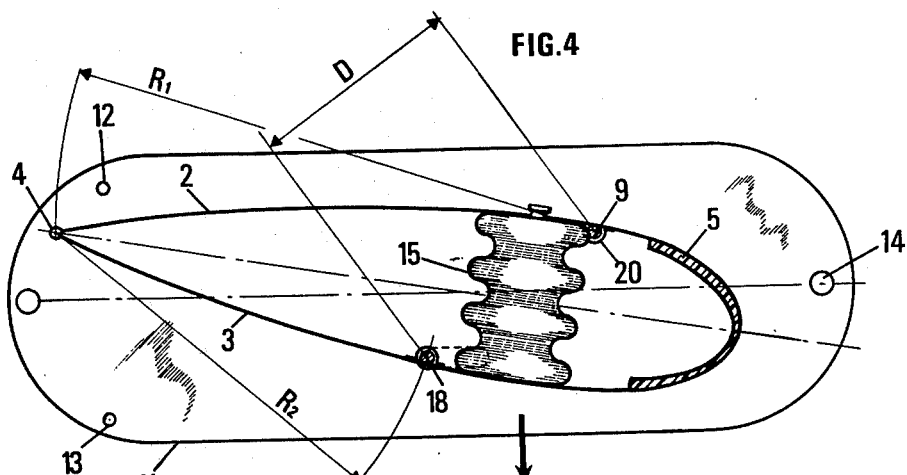
FIG. 4 is a cross-sectional view of the wing in descending position.

According to a first embodiment shown in FIGS. 1 to 6, the device comprises a wing 1 provided with a first profiled plate or upper wing surface 2 and a second profile plate or lower wing surface 3, interconnected at one of their ends (trailing edge) through a hinge 4 and at their other end through a preformed incurved wall 5 made of a deformable material (FIG. 2) which forms the leading edge. Both plates respectively comprise lateral walls 6, 7 (FIG. 3). The upper wing surface 2 is adapted to fit on lower wing surface 3 but the internal volume of the wing is not tightly sealed from the external medium. When the device is submerged, water fills up the internal volume of the wing.

The wing is laterally traversed with a rod 9 forming a rotation axis pivotable about bearings 20 secured for example to the internal surface of the upper wing surface. Two lateral plates or flanges 10, 11, are arranged on both sides of the wing, parallel to the side walls 6, 7, of the two plates 2, 3 and rigidly secured to each other through rod 9 as well as through two beams 12 and 13.

The flanges 10 and 11 are perforated with holes 14 for securing the device to the submerged element to be stabilized at a substantially constant submersion depth.

One or more cylindrical manometric boxes, deformable exclusively in the direction of their axes of revolution, are arranged inside the wing and their end walls are secured, through bolts 16, to the facing surfaces of the lower wing surface 3 and extrados 2. These manometric boxes are made for example of rubber reinforced with metal rings. Valves 17 are arranged through the upper wing surface and enable to inflate the manometric boxes 15 to a predetermined pressure.

A rod 18 is also arranged inside the wing 1. It passes through the lateral walls 7 of the lower wing surface 3 and its end parts are housed in two elongate ports 19 arranged in the lateral flanges 10, 11.

Figure 5:
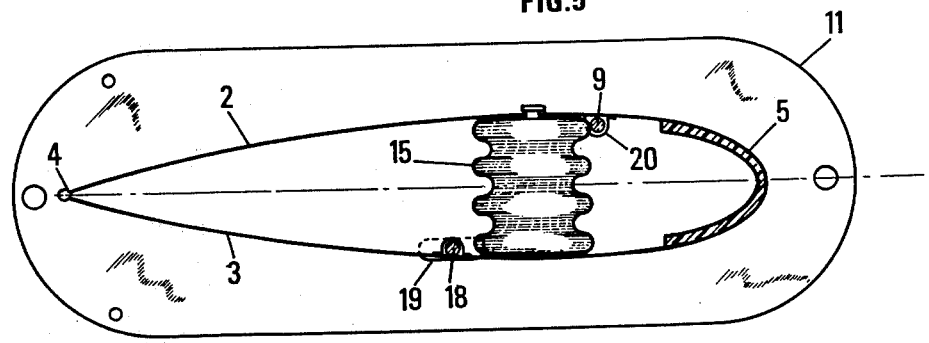
FIG. 5 is a cross-sectional view of the wing in neutral position.

The rods 9 and 18 are respectively secured to the upper wing surface 2 and to the lower wing surface 3 on both sides of the locations where the manometric boxes 15 take their bearings on the two plates of the wing, the rod 9 being closer to the leading edge. The greater length of direction of ports 19 is inclined with respect to the segment of length D (FIG. 4) joining the two rods 9 and 18 and is, for example, substantially parallel to the transverse axis of the ring, i.e., the axis joining the leading edge to the trailing edge of the wing, when the latter is in a neutral position at which it moves at a constant depth (FIG. 5).

The distance D, between rods 9 and 18, is selected in relation with the length of the manometric boxes 15, so that the wing be in neutral position when the gas pressure inside said boxes balances the external hydrostatic pressure corresponding to the reference depth.

References $R_1$ and $R_2$ designate the fixed distances between the hinge 4 and respectively the rods 9 and 18.

Figure 6:
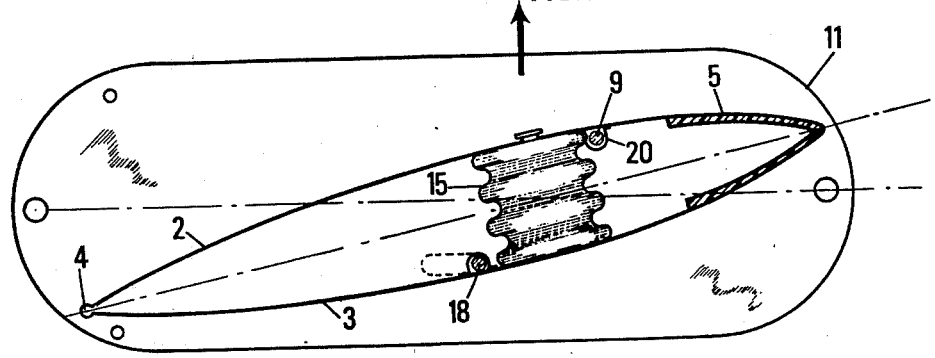
FIG. 6 is a cross-sectional view of the wing in ascending position.
Figure 2:
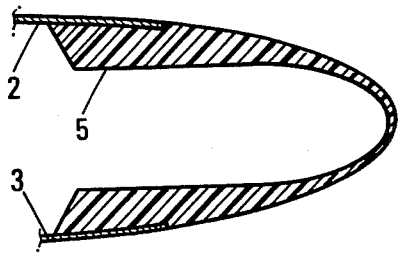
FIG. 2 shows more in detail the deformable wall linking two walls of the wing.

This device operates in the following manner. When the submerged towed assembly sinks below the level at which the wing is in neutral position, the hydrostatic pressure becomes higher than the inflating pressure of the manometric boxes and compresses them in the direction of their axis. The lower wing surface 3 and upper wing surface 2 of the wing then tend to come nearer to each other and distance D between rods 9 and 18 decreases. The rod 9 moves in port 19 towards the leading edge of the wing. But, since distances $R_1$ and $R_2$ are constant, this movement is only possible through a downward rotation of hinge 4 (FIG. 6). The leading edge then moves upwardly and the hydrodynamic pressure acts to lift the wing and, consequently, to bring it back, together with the associated submerged element, to the reference depth. When pressure equilibrium is restored, the wing is again in neutral position.

When the submerged towed assembly rises above the reference level (neutral position of the wing), the hydrostatic pressure becomes lower than the inflating pressure of the manometric boxes. The latter one inflated in the direction of their axes of revolution and tend to move lower wing surface 3 and upper wing surface 2 of the wing apart from each other (FIG. 4). Distance D then increases and rod 18 tends to move apart from rod 9 by sliding in port 19. For the same reason as above, this movement is only possible through an upward rotation of the hinge 4. The leading edge of the wing pivots downwardly and the hydrostatic pressure results in a force which tends to bring back the wing to its reference level.

In the embodiment shown in FIG. 7, the wing 1 is articulated through rod 9 and legs 21 onto a tubular support member 22. The manometric boxes are replaced by an inflatable enclosure or bladder of flexible material. The bladder communicates with the external medium by means of a valve 23 wherethrough air can be blown at a determined pressure corresponding to the desired depth level. As in a preceding embodiment, the bladder may communicate, through valve 23, with a pressurized fluid containing a reservoir of large capacity as compared to the internal volume of the bladder. Springs 8 are secured, on the one hand, to upper wing surface 2 and, on the other hand, to the axis 18, rigidly fastened to the intrados 3, for example.

The tubular support member 22 and the legs 21 may obviously be replaced by flanges 10, 11 illustrated on FIG. 1 or by any convenient fastening system.

The operation of this device is substantially the same as in the preceding embodiment. However, when the bladder is compressed by the effect of the hydrostatic pressure of the water contained in the wing, it cannot impart to both walls of the wing the deformation to which it is subjected, except if it is secured thereto. The springs 8 have the effect to bring nearer to each other the walls 2 and 3 of the wing, and, consequently, to allow the upward rotation of the leading edge.

In both embodiments, before the submersion of the device, compressed air is blown into the manometric boxes 15 or into the bladder, at a pressure substantially equal to the hydrostatic pressure prevailing at the reference depth and, consequently, higher than the atmospheric pressure. The wing then takes the position shown in FIG. 4. When the device is submerged, its submersion speed, very high at the beginning, will progressively decrease, due to the flattening of the wing to its neutral position and then become stable when pressure equilibrium is established.

It would not be outside the scope of the invention to replace the manometric boxes 15 or the bladder by any internal device whose volume changes in response to a pressure stress. It may be advantageous to establish communication between said internal device of variable volume and an external reservoir filled up with compressed air, of large capacity as compared to their volume. Said internal device may also be fed with compressed air directly from a towing ship.

What I claim is:

1. A device for controlling the depth of an element moving through water so as to maintain it at a reference depth, comprising a wing pivotable with respect to the element, characterized in that said wing comprises at least two walls forming the lower wing surface and the upper wing surface, movable with respect to each other, and a system for converting the space variation between the two walls, in response to the hydrostatic pressure variation, to a rotation of the wing about an axis of rotation rigidly secured to the submerged element.

2. A device according to claim 1, characterized in that the two walls are articulated on an articulation axis, at one of their ends, and joined at another end through a deformable element.

3. A device according to claim 2, characterized in that it comprises means for moving apart the two walls by application of a force substantially equal to that exerted by the hydrostatic pressure prevailing at the reference depth and in that the conversion system comprises a rod fastened to the wing and movable with respect to the rotation axis in an elongate port arranged in at least one wall fixedly secured to the element and whose greater length is oriented in a direction different from a line joining the rotation axis to the rod.

4. A device according to claim 3, characterized in that the means for moving apart the two walls by application of a force, comprises at least one manometric box, fastened to both walls, located between them and deformable along a main direction under the action of the pressure difference between the hydrostatic pressure and the pressure corresponding substantially to the hydrostatic pressure at the reference depth, of a fluid injected in the manometric box, said pressure difference producing a modification of the spacing between the movable walls of the wing, along said main direction of deformation.

5. A device according to claim 3, characterized in that the means for moving apart the two walls by application of a force, comprises an inflatable enclosure located between the two movable walls of the wing.

6. A device according to claim 5, characterized in that the conversion system further comprises springs exerting a force which brings nearer to each other the two movable walls of the wing.

7. A device according to claim 3, characterized in that the means for exerting between the two walls a force moving them apart from each other, comprises at least one internal device placed between the deformable walls of the wing, filled with a pressurized fluid and whose volume is variable in response to the external pressure.

8. A device according to claim 7, characterized in that it comprises means for establishing communication between said device and a reservoir containing a pressurized fluid.

9. A device according to claim 7, characterized in that said internal device is directly connected to compressed air feeding means located on a towing ship.

10. A device according to claim 1, characterized in that the wing is arranged between two lateral flanges and connected thereto through said rotation axis.

* * * * *